United States Patent [19]

Yokomizo

[11] Patent Number: 4,575,846
[45] Date of Patent: Mar. 11, 1986

[54] DATA COMMUNICATION SYSTEM

[75] Inventor: Yoshikazu Yokomizo, Kawagoe, Japan

[73] Assignee: Canon Kabushiki Kaisha, Tokyo, Japan

[21] Appl. No.: 538,741

[22] Filed: Oct. 3, 1983

[30] Foreign Application Priority Data

Oct. 8, 1982 [JP] Japan ................................. 57-176054
Oct. 8, 1982 [JP] Japan ................................. 57-176055

[51] Int. Cl.$^4$ .............................................. H04J 3/26
[52] U.S. Cl. ........................................ 370/90; 370/89; 340/825.5
[58] Field of Search ................. 370/90, 89, 88, 95, 370/85, 94; 340/825.5

[56] References Cited

U.S. PATENT DOCUMENTS

| 3,732,543 | 5/1973 | Rocher et al. | 370/89 |
| 3,755,789 | 8/1973 | Collins | 370/88 |
| 3,790,717 | 2/1974 | Abramson et al. | 370/90 |
| 4,000,378 | 12/1976 | Caplan | 370/90 |
| 4,491,946 | 1/1985 | Kryskow et al. | 370/89 |

FOREIGN PATENT DOCUMENTS 0151743 9/1983 Japan ................................. 370/90

Primary Examiner—Douglas W. Olms
Attorney, Agent, or Firm—Fitzpatrick, Cella, Harper & Scinto

[57] ABSTRACT

A data communication system with plural terminals in which efficient data communication without collision can be ensured by transferring the right of communication from one station to another in a determined procedure and by detecting a station which has joined the system at an intermediate timing by means of a particular command.

9 Claims, 11 Drawing Figures

FIG. 5

| NAME | NO. | CONTROLLER | NO. |
|---|---|---|---|
| LINE DRIVER | 26 | CCU | 22 |
| LINE DRIVER | 27 | CCU | 22 |
| LINE DRIVER | 28 | READER | 1a |
| LINE DRIVER | 29 | MEMORY | 6a |
| LINE DRIVER | 30 | MEMORY | 6a |
| LINE DRIVER | 31 | PRINTER | 2a |

FIG. 7

| MODE / SIGNAL LINE | TERMINAL HAVING SUBMASTER | | TERMINAL HAVING NO SUBMASTER | | |
|---|---|---|---|---|---|
| | | | TERMINAL SELECTED WITH $\overline{DS}$ | | TERMINAL NOT SELECTED WITH $\overline{DS}$ |
| | COMMAND & DATA XMSN | COMMAND & DATA RECEIVING | DATA XMSN | DATA RECEIVING | |
| $\overline{BUS}$ | OUTPUT | INPUT | OUTPUT | INPUT | — |
| SIG CLK | OUTPUT | INPUT | OUTPUT | INPUT | OFF |
| COM CLK | OUTPUT | INPUT | OUTPUT | INPUT | OFF |
| $\overline{BUSY/ACK}$ | INPUT | OUTPUT | INPUT | OUTPUT | OFF |
| $\overline{REQ}$ | OUTPUT | OUTPUT | INPUT | INPUT | OFF |
| $\overline{DS}$ | OUTPUT | OUTPUT | INPUT | INPUT | INPUT |
| $\overline{R/W}$ | H | L | INPUT | INPUT | OFF |
| $\overline{USE}$ | L | L | INPUT | INPUT | INPUT |

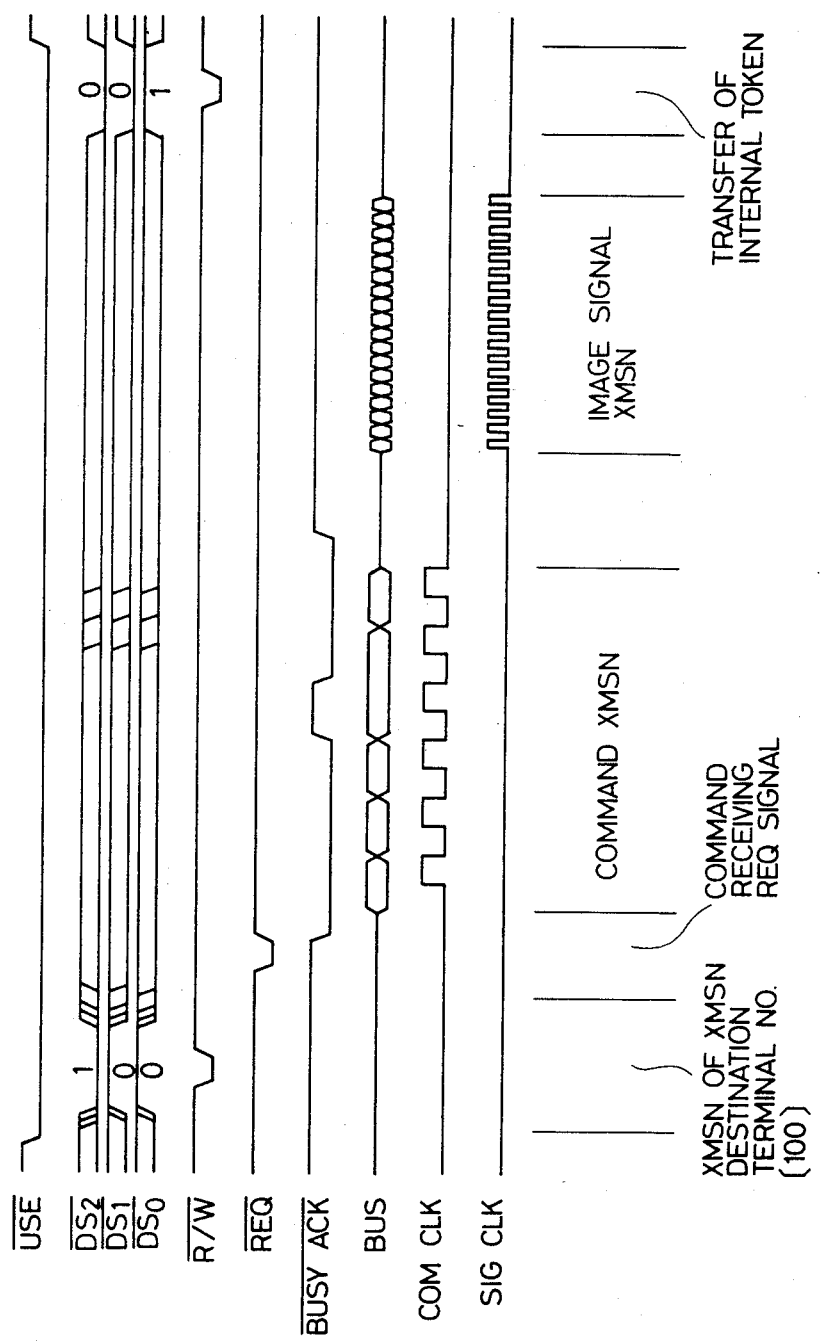

DATA COMMUNICATION SYSTEM

BACKGROUND OF THE INVENTION

1. Field of the Invention

The present invention relates to a data communication system for data communication among plural stations, and more particularly to such a data communication system adapted for use in an image communication network composed of plural stations each comprising an image reading device and an image output device and mutually connected through transmission channels such as optical fibers for image communication among stations or within a station.

2. Description of the Prior Art

FIG. 1 shows an example of the image communication network utilizing a conventional image communication process, including image reading (reader) units 1a, 1c–1e; image output (printer) units 2a–2d; modulating/demodulating (modem) units 3a–3f; optical fiber communication cables 4a–4f connecting said modems 3a–3f; and cables 5a–5f connecting the readers 1a, 1c–1e with the printers 2a–2d or a memory 6f for temporarily storing the image signals.

In the image communication network of the above-described structure, the image signals read in the reader 1a can be transmitted to the printer 2a of the same station through the cable 5a for image recording, or transmitted through the modem 3a and the optical fiber 4a to other printers 2b–2d of other stations for image recording. Also in case of image editing such as image trimming, coordinate displacement or image synthesis the image signals have to be temporarily stored in the memory 6f for subsequent signal reading and image processing, and, in such case, the memory 6f can function as a terminal independent from the readers 1a, 1c–1e since said memory 6f is connected to the optical fibers 4a–4f through the modem 3f. Consequently the data transmission to the memory 6f can be designed with the substantially same principle as that for the data transmission to the printers 2a–2d.

However, for example, in case there is to be obtained a hundred copies from image signals stored in the memory 6f, the optical fibers 4a–4f are occupied during the transmission of the image signals one hundred times, so that other stations cannot achieve data communication through the optical fibers 4a–4f during the above-mentioned copying operation.

Also there have been proposed various communication control processes for avoiding data collision and achieving smooth data communication in the communication network. However such processes have not provided adequate procedures in case plural terminals or stations join the communication in the course thereof.

SUMMARY OF THE INVENTION

In the consideration of the foregoing, the present invention is to provide a data communication system capable of smooth and efficient data communication.

Another object of the present invention is to provide a data communication system suitable for transmitting image signals.

Still another object of the present invention is to provide a data communication system capable of applying adequate procedure to a terminal joining the communication already under way.

The foregoing and still other objects and the advantages thereof will become fully apparent from the following description.

BRIEF DESCRIPTION OF THE DRAWINGS

FIG. 5 is a chart showing the control map of the line driver shown in FIG. 4;

FIG. 7 is a chart showing the status of the signal lines shown in FIG. 6;

FIG. 8 is a timing chart showing output signals from various signal lines; and

DETAILED DESCRIPTION OF THE PREFERRED EMBODIMENTS

Now the present invention will be clarified in detail by embodiments thereof shown in the attached drawings.

Figure 1:
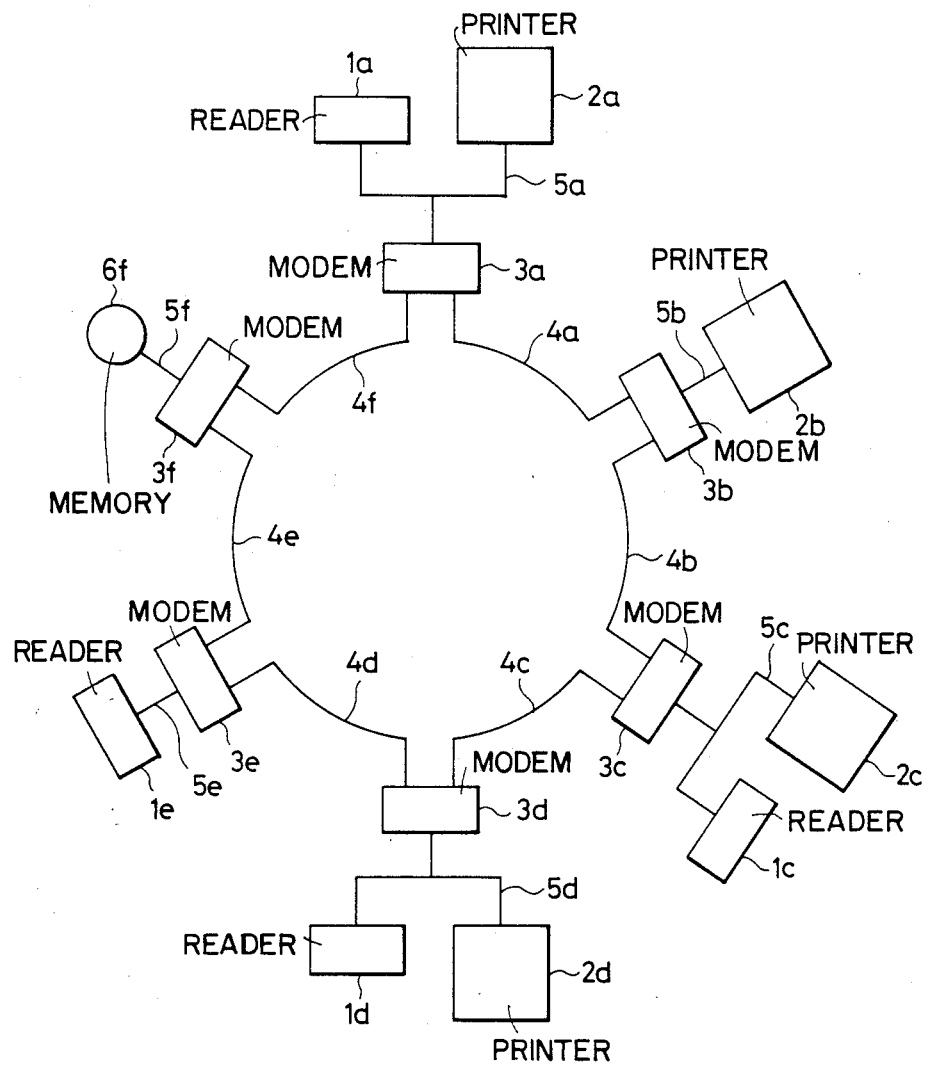
FIG. 1 is a block diagram showing an image communication network utilizing a conventional optical fiber communication process.
Figure 2:
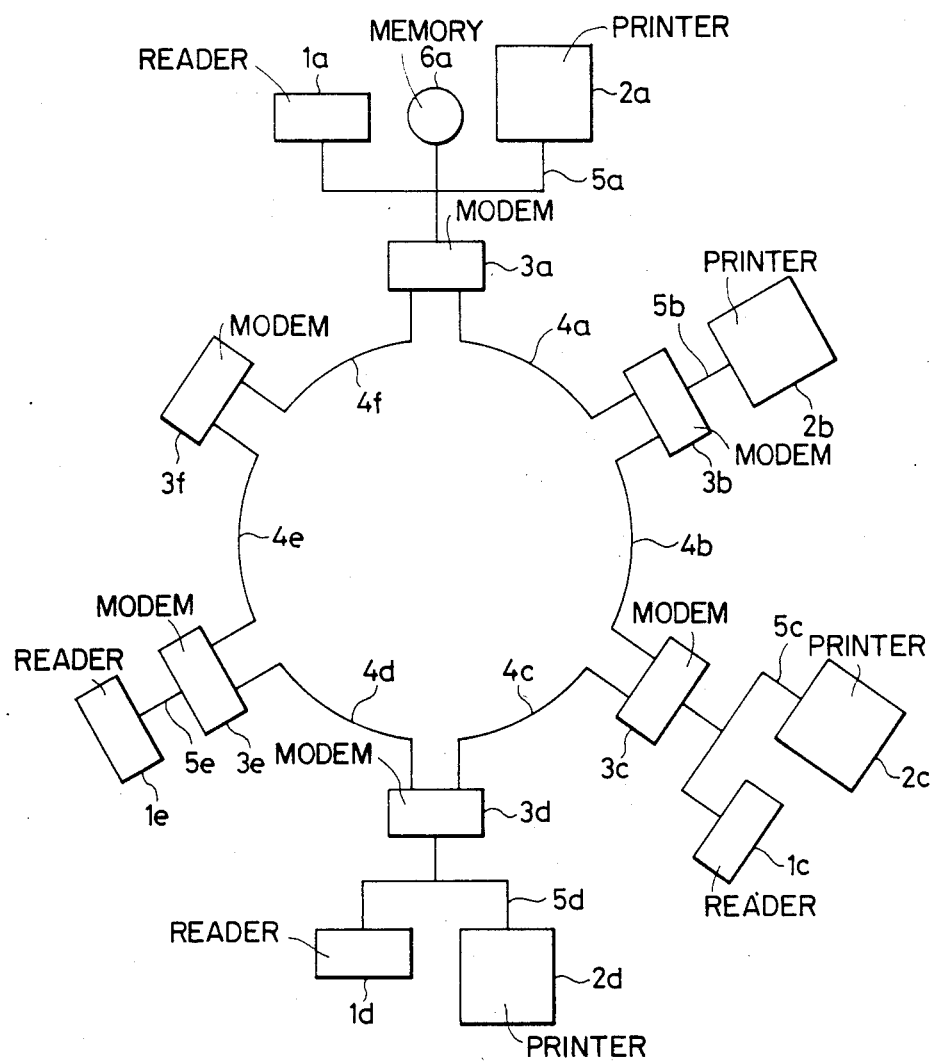
FIG. 2 is a block diagram showing a network embodying the present invention.

At first reference is made to FIG. 2 showing an image communication network embodying the present invention, wherein components which are the same as those shown in FIG. 1 are represented by same numbers and will not be explained further. In this system, the right of communication of each station is determined by a so-called token passing method. Each set of reader, printer etc. connected to each of the modems 3a–3f through cables 5a–5e is called a sub-system and is represented by a letter. For example, sub-system a is composed of the reader 1a, printer 2a, modem 3a, communication cable 5a and memory 6a, and sub-system b is composed of the printer 2b, modem 3b and communication cable 5b. In this manner each of the sub-systems a–f is constructed according to its respective purpose.

The memory 6a connected with the modem 3a of said sub-system a through the communication cable 5a can be used from all other sub-systems through said modem 3a, or can be used exclusively within the sub-system a by disconnecting the cable 5a from the modem 3a. For example, in the case where there is to be obtained 100 copies from a same original within the sub-system a, the image signals read by the reader 1a are temporarily stored in the memory 6a, from which said signals are transmitted 100 times to the printer 2a through the cable 5a for obtaining plural copies. Such operation is called memory retention. In such memory retention mode the communication cable 5a is detached from the modem 3a as explained above, so that the optical fibers 4a–4f are maintained free to ensure the data communication between other sub-systems, for example between e and b.

Such memory retention mode operation has an advantage of high-speed transmission within a sub-system. The communication cable 5 within a sub-system generally limited to 10 meters allows high-speed base band communication. On the other hand, communication between different sub-systems through modems 3 and optical fibers 4, generally involving a distance in the order of 100 meters, has to be made through a modulated communication, so that the transmission speed is inevitably lower regardless of which modulating method, such as frequency modulation, phase modulation or Manchester modulation, other than the optical multiple communication, is employed. The access to the memory 6a from other sub-systems through the optical fibers 4 has therefore to depend on a lower transmission speed as in the conventional system. It is nevertheless possible to obtain a significant improvement in the throughput in the entire system by placing the memory 6a in a sub-system requiring a large amount of copying operations.

Figure 3:
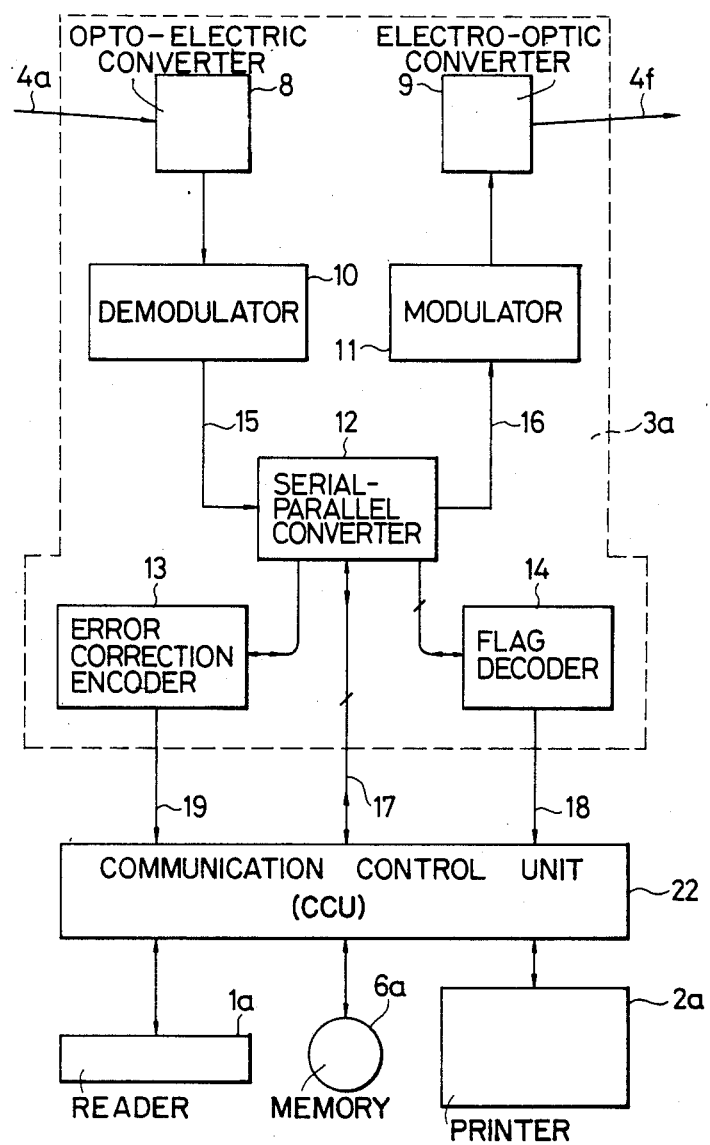
FIG. 3 is a block diagram showing the details of the modem unit in the embodiment shown in FIG. 2.

FIG. 3 shows the details of a sub-system or node, for example sub-system a, employed in the network of FIG. 2. There are provided an optoelectric (0/E) converter 8 connected with the optical fiber 4a and an electrooptical (E/0) converter 9 connected with the optical fiber 4f, respectively at the input end and the output end of the image signals, whereby said optical fibers 4a, 4f transmit the signals only in one direction. A demodulator 10 connected with the input converter 8 and a modulator 11 connected with the output converter 9 rely for example on Manchester modulation which is convenient for detecting troubles in the network, since in this modulating method the signals always have certain changes due to the presence of clock components even when the data subjected to modulation are all "0".

The demodulator 10 supplies, through a serial input signal line 15, serial base band digital signals not including a carrier. A serial output signal line 16 also transmits similar serial base band digital signals not including a carrier. Said serial signals supplied from the demodulator 10 are converted, by a serial-to-parallel converter 12, into parallel signals which are transmitted or received by a packet communication method with a minimum unit of 52 bits. For achieving correct communication, each packet is preceded by the followed by 8 flag bits. A flag decoder 14 identifies a flag code, for example including six consecutive "1" bits such as "01111110", supplied through 8 signal lines from the serial-to-parallel converter 12 to terminate the input shifting operation of said serial-to-parallel converter 12 and to release a "1"-level signal to a flag detection signal line 18, thus indicating the completion of data reception to a communication control unit (CCU) 22.

At this point data are already received through 56 parallel input-output signal lines 17. The CCU 22 consists of a microcomputer unit for executing commands in the received data, and a switching circuit for directing the flow of data into a desired direction. The CCU 22 corrects the received data which have been subjected to so-called transmission process for differentiation from the above-mentioned flag code. More specifically, at the signal transmission from the converter 12, any consecutive six "1" bits in the frame data are broken by the insertion of a bit "0" for the purpose of differentiation from the flag code, and the CCU 22 restores the original data by eliminating thus inserted bit "0" at the signal reception.

An error correction encoder 13 is provided between the serial-to-parallel converter 12 and the CCU 22, and a cyclic redundancy check code according to a formula $X^{16}+X^{12}+X^5+1$ is provided in a 16-bit area in the parallel signals. The parallel signals with said cyclic code are supplied to said error correction encoder 13, which, in response to the detection of an error in the data, supplies a "1"-level signal through an error detection signal line 19 to indicate the presence of an error in the received data to the CCU 22, and simultaneously corrects any error of 1 bit. The reader 1a, memory 6a and printer 2a are mutually connected through the CCU 22 for allowing mutual communication. The CCU 22 may be included in the modem 3a represented by a broken-lined frame.

Figure 4:
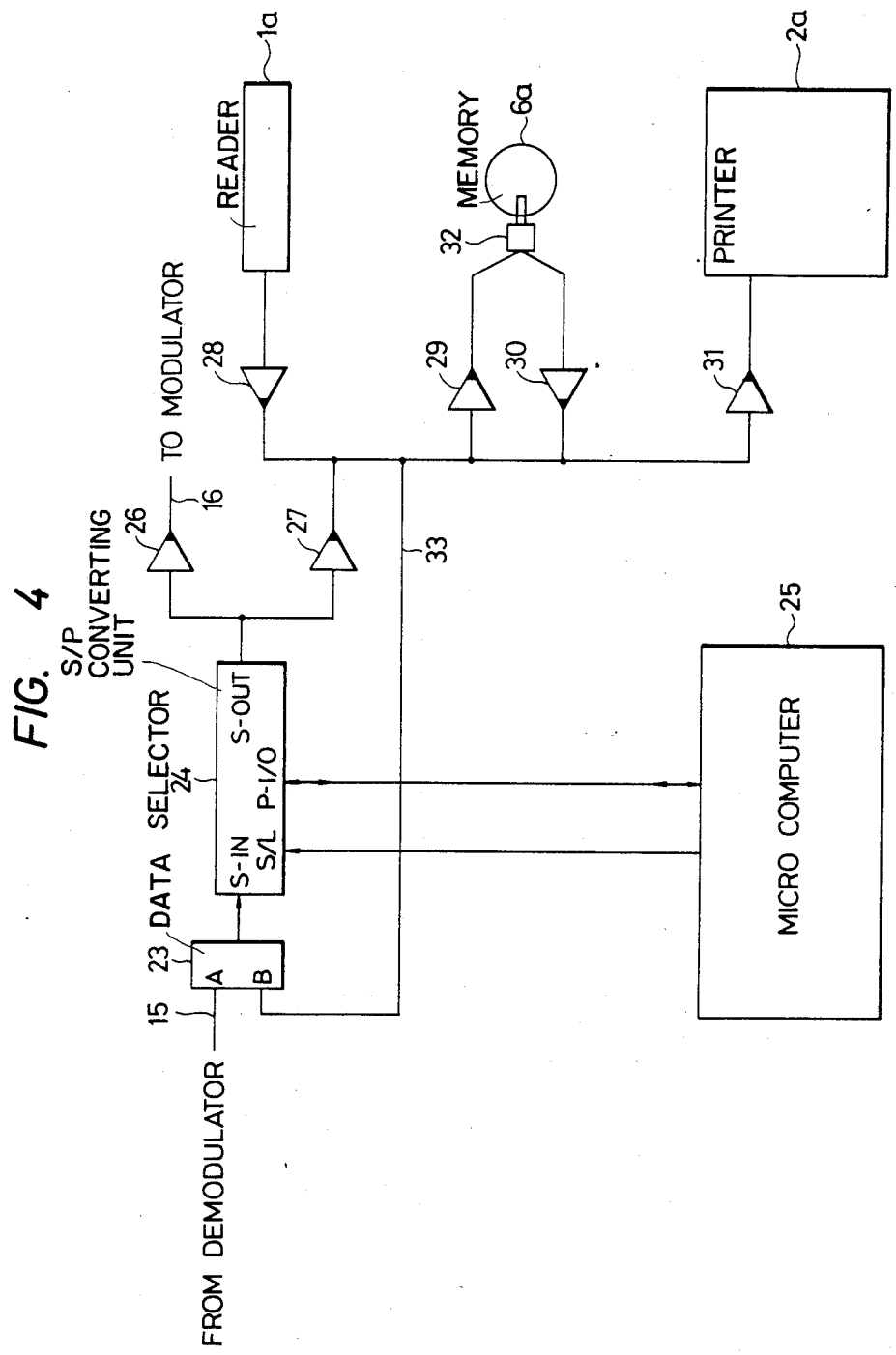
FIG. 4 is a block diagram showing the details of the serial-parallel converter and the communication control unit shown in FIG. 3.

FIG. 4 shows the details of essential parts of the serial-to-parallel converter 12 and the communication control unit 22 shown in FIG. 3, wherein a data selector 23 supplies either the serial signals, supplied from the demodulator 10 through the serial input signal line 15, or serial signals supplied through an internal line 33 to a serial input terminal S-IN of a serial-to-parallel converting unit 24. A microcomputer 25 provided in the CCU 22 decodes the input commands and generates the output commands through data exchange with an input-/output terminal P-I/0 of the serial-to-parallel converting unit 24. A serial output terminal S-OUT of the serial-to-parallel converting unit 24 is connected through a line driver 26 to a serial output signal line 16 leading to the modulator 11, and also through a line driver 27 to internal signal line 33 within the sub-system.

There are provided additional line drivers 28–31, of which 28 is used as a serial output buffer for the reader 1a, 29 and 30 are used as serial input/output buffers for the memory 6a, and 31 is used as a serial input buffer for the printer 2a. A disk controller 32 controls the data input and output of the memory 6a. The above-described line drivers 26–31 are capable of three-state control, and are used in the controls summarized in FIG. 5. It is to be noted that FIG. 4 principally shows the signal flows and does not indicate the control lines.

Figure 6:
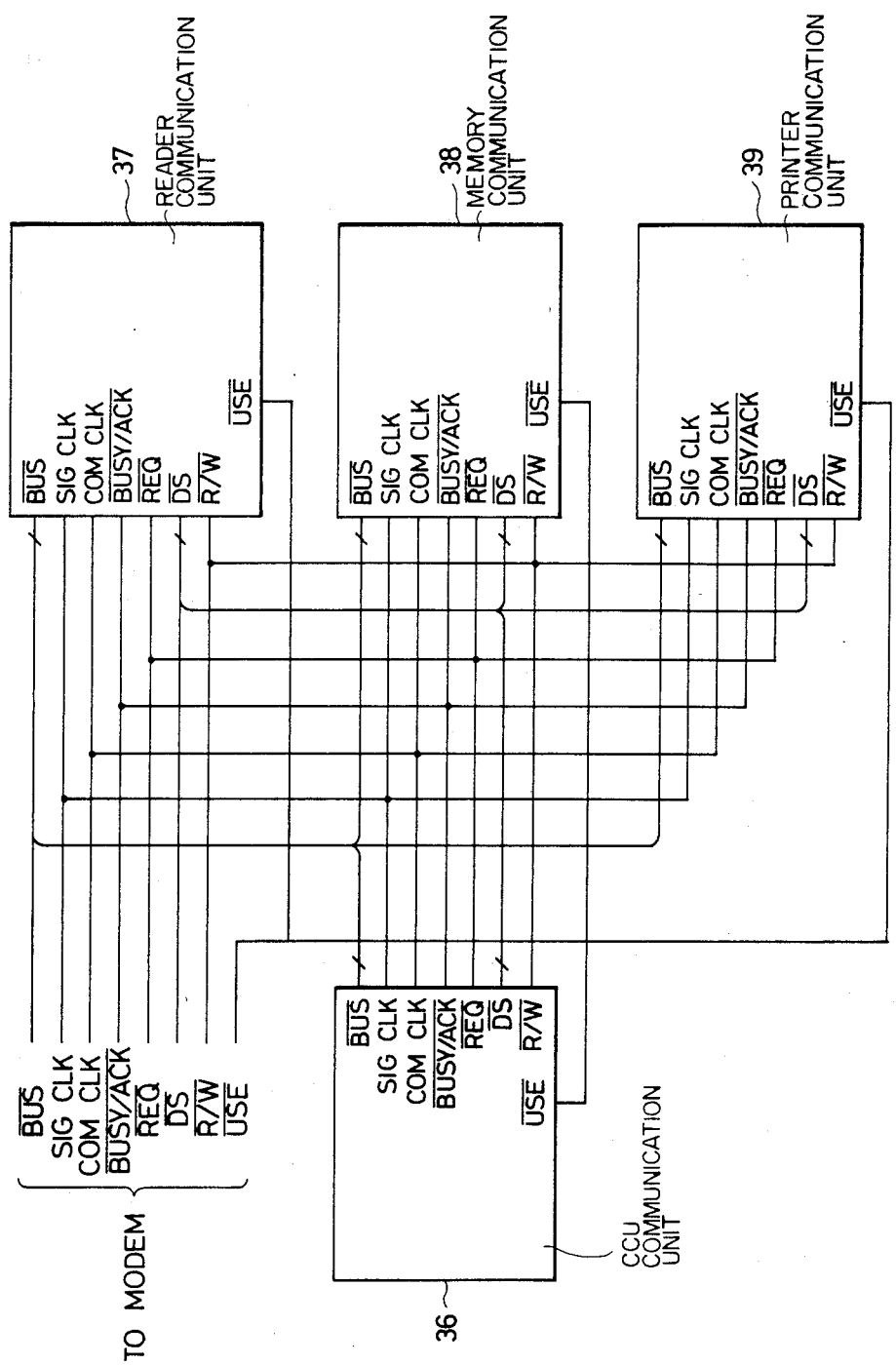
FIG. 6 is a block diagram showing the details of the internal exchange lines shown in FIG. 4.

FIG. 6 shows the details of the internal signal lines 33 in the sub-system, including the control lines omitted in FIG. 4, wherein first, second, third and fourth units 36, 37, 38, 39, respectively composed of a microcomputer such as Motorola M6805 constitute communication units respectively of the communication control unit, reader, memory and printer, with respectively unit address numbers 001, 010, 011 and 100. For controlling the communication among said units, there is employed so-called token passing method in which data communication is permitted only to a unit having the right of communication. More specifically, for example the first unit 36 connected with the optical fiber 4 is constructed in such a manner that it can acquire a token or a communicating right under the token passing method among the sub-systems in the network, and also another independent token for the internal signal lines 33. The latter token to be passed among the units 36–39 of the sub-system shall hereinafter be called the "internal token", while the former token for communication through the optical fiber 4 shall be called "token", or "external token" if particular distinction is required. Also a sub-system having said external token shall be called "master", and a unit having said internal token shall be called "sub-master".

A serial signal line or bus $\overline{BUS}$ is used for transmitting commands and image signals. A synchronization signal or signal clock SIG CLK is generated in case the serial signals transmitted through said serial signal line $\overline{BUS}$ are image signals. A synchronization signal or command clock COM CLK is generated in case the serial signals transmitted through said serial signal line $\overline{BUS}$ are commands. Consequently said signal clock SIG CLK or command clock COM CLK allows to identify whether the signals on the serial signal line $\overline{BUS}$ are image signals or commands. The command transmission with an exclusive VLSI is common but cannot achieve a very fast transmission speed. Consequently the command transmission with clock synchronization as explained above is preferable in case a high-speed transmission is required. There are also employed a transmission request signal $\overline{REQ}$, a device selecting signal $\overline{DS}$ transmitted through three signal lines $\overline{DS0}$, $\overline{DS1}$, $\overline{DS2}$, a busy/acknowledge signal $\overline{BUSY/ACK}$ indicating the completion of request reception or data reception, a read/write signal $\overline{R/W}$, and a use signal $\overline{USE}$ indicating the declaration of sub-master. The above-mentioned signals $\overline{BUSY/ACK}$, $\overline{REQ}$, $\overline{DS}$ $\overline{R/W}$ and $\overline{USE}$ are bidirectional and have open collector output format. Other signals $\overline{BUS}$ SIG CLK and COM CLK are also bidirectional and have totem pole output format.

Now reference is made to FIG. 6 and also to a timing chart shown in FIG. 8 for explaining the command communication control operation in the sub-system. It is assumed, as an example, that the second unit 37 is currently the sub-master having the internal token. In case of sending a command to the fourth unit 39 from said sub-master 37, it selects said fourth unit 39 by shifting the sub-master declaration signal $\overline{USE}$ to the low level state, sending the address 100 of said fourth unit as the device selecting signal $\overline{DS}$ and maintaining the read/write signal $\overline{R/W}$ during said sending. The unit address number of said unit 39 is previously selected for example as [100] by an unrepresented selector switch provided in the unit 39. Then the request signal $\overline{REQ}$ is shifted to the low level state for a short duration to interrupt the operation of the microprocessor of the unit 39. Simultaneously the receiving unit 39 shifts the completion signal $\overline{BUSY/ACK}$ to the low level state by hardware, thus indicating that a command can be received. Upon detection of the low level state of said signal $\overline{BUSY/ACK}$, the transmitting unit 37 sends the command as serial signals on the serial signal line $\overline{BUS}$, with the command clock COM CLK as the synchronization signal as explained above. Upon reception of all the bits of the command transmitted from the unit 37 through the signal line $\overline{BUS}$, the unit 39 shifts the signal $\overline{BUSY/ACK}$ to the high level state, thus indicating the completion of reception of a command. Image signals are transmitted through the signal line $\overline{BUS}$, if necessary, subsequent to the transmission of said command. The read/write signal $\overline{R/W}$ is maintained at the high level during the above-described procedure. Also the token-holding unit 37 maintains the sub-master declaration signal $\overline{USE}$ at the low level state throughout the period of above-described procedure. Any other unit in the sub-system cannot become the sub-master during the low level state of said signal $\overline{USE}$. Upon completion of the data transmission in this manner, the unit 37 shifts the sub-master declaration signal $\overline{USE}$ to the high level state, thus permitting the transfer of the internal token to other units.

FIG. 7 shows an example of level states of the signal lines shown in FIG. 6, wherein H, L and OFF respectively indicates a high level state, a low-level state and a third level state. The mode switching is controlled by signal lines $\overline{USE}$, $\overline{DS}$ and $\overline{R/W}$. The hardware of the system is constructed in such a manner that a determined unit 37 becomes the sub-master at the initial state of the system, namely at the start of power supply. Such sub-master selection can be achieved by setting the device selecting signal $\overline{DS}$ to [001] at said initial state by means for example of an unrepresented switch.

In the absence of transmitting job, the sub-master has to transfer the internal token to another unit after the lapse of a determined time, in a manner to be explained in the following. In such case, the sub-master transfers the internal token to a unit of which unit address number is larger by one than that of the sub-master. The transfer of the internal token is completed upon transmission of a confirmation signal, indicating the reception of the internal token, from the token-receiving unit to the original sub-master. However, in the transfer of the internal token from the unit of a unit address [001] to the unit with a unit address [010], if said confirmation signal is not received due to the absence of such unit address [010] or due to the unavailability of such unit for communication for example by a failure, the transfer of the internal token is then tried to a unit of a next larger unit address [011]. The unit with the address [001] remembers the absence or unavailability of the unit address [010] and, at the next transfer of the internal token, passes it to the unit [011], skipping the unit [010]. In a similar manner the unit address for the internal token at the next transfer is determined for each unit.

Now reference is made to FIG. 7 for explaining the control operation in case a unit joins the system after the communication has already been started. The unit address of such newly joining unit is skipped if the transfer of the internal token has been done around the system. For this reason each unit not becoming the sub-master at the initial state of the system is given, in addition to its own unit address, a common address [111] for joining the communication, only at the start of power supply to said unit. The successive transfer of the internal token in the order of increasing unit addresses explained above eventually reaches a step of transfer to a maximum unit address [111], and this address [111] alone will not be skipped at the next transfer of internal token even if a confirmation signal indicating the reception of the internal token is not received. Consequently a unit which is given power supply later than the initialization of other units in the system, being given a unit address [111] in addition to its own address, can join the system when the unit address [111] is requested, and the signal $\overline{BUSY/ACK}$ is shifted to the low level state in response thereto. Subsequently the [111] receives the command alone, disregarding the transferred internal token, and changes the unit address from [111] to its own unit address. On the other hand, the sub-master detects the reception of the command to the unit address [111] from the change of said signal $\overline{BUSY/ACK}$, thus identifying the new entry of a unit to the system after the initial state, and enters a reset mode to be explained in the following.

In this state a broadcasting mode is executed utilizing a unit address [000], in which a common address [000] is given to all units in addition to the above-explained common address [111]. The submaster changes the device selecting signal $\overline{DS}$ to [000] and transmits a reset command, thereby shifting all the units other than the sub-master to the reset mode. Through this operation the unit addresses skipped at the preceding transfers of the internal token are revived, whereby a unit joining the communication later is entitled to received the internal token. Subsequent to the resetting operation, the sub-master tries to transfer the internal token to a unit with the unit address [001]. On the other hand, in the absence of a unit with the unit address [111], namely in the absence of a newly joining unit, the internal token is transferred immediately to the unit with the address [001] without the above-described resetting operation.

Figure 9:
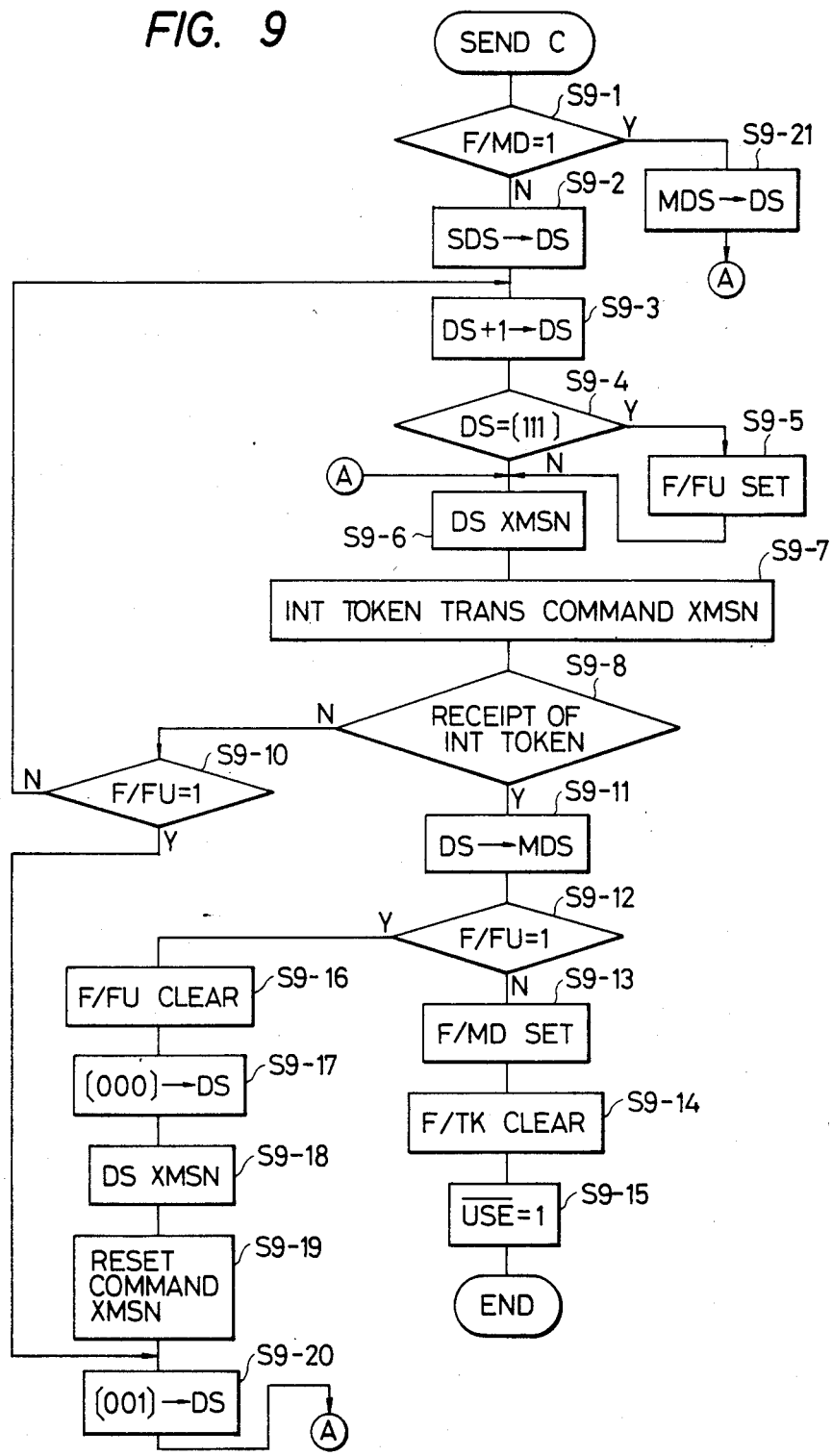
FIGS. 9 to 11 are flow charts showing the procedure of token passing.
Figure 10:
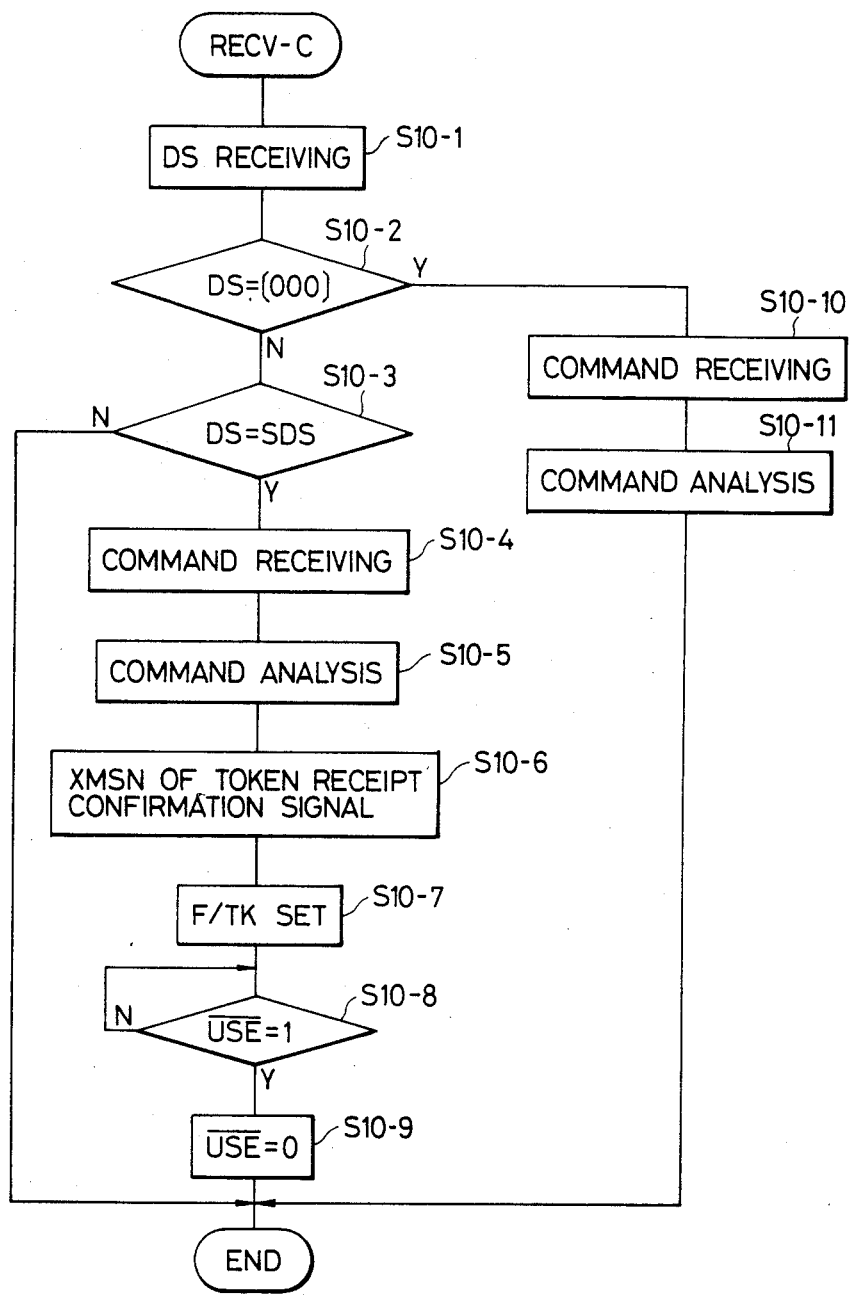

The above-described procedure will now be explained in more detail with reference to flow charts shown in FIGS. 9 and 10. A token-transferring unit, in the absence of a register flag F/MD to be explained later (step S9-1), sets its own unit address SDS as the device selecting signal DS (step S9-2), adds one to said device selecting signal DS (step S9-3), then identifies whether thus obtained signal DS is equal to a final unit address [111] to be explained later (step S9-4), and, if not, executes the transmission of said device selecting signal DS (step S9-6) followed by the transmission of an internal token transfer command (step S9-7).

Each unit receiving said device selecting signals DS (step S10-1) identifies whether said signal is a broadcasting address [000] to be explained later (step S10-2), then, if not, identifies whether said signal is equal to the unit address SDS of said unit (step S10-3), and if not, executes no operation. On the other hand, if said signal is equal to its own unit address, the unit receives the decodes the succeeding command (steps S10-4 and S10-5), then transmits a token reception confirmation signal (step S10-6) and sets a token flag F/TK indicating the presence of the internal token (step S10-7). Then, in response to the shift of the declaration signal $\overline{USE}$ to the high level state by the preceding sub-master (step S10-8), the unit in turn shifts said signal $\overline{USE}$ to the low level, thus declaring the position of sub-master to other units.

On the other hand, the sub-master which has transmitted the internal token transfer command as explained above stores, in response to the token reception confirmation signal from another unit (step S9-8), the unit address DS to which the internal token is transferred, in a unit address register MDS (step S9-11). Then said sub-master identifies whether a final unit flag F/FU to be explained later is set (step S9-12), and, if not, sets the register flag F/MD (step S9-13), clears the token flag F/TK (step S9-14) and shifts the declaration signal $\overline{USE}$ to the high-level state, thus completing the transfer of the internal token.

In case the token reception confirmation signal is not received from the selected unit, the device selecting signal DS is increased by one and the above-described token transfer operation is repeated with thus increased device selecting signal DS.

As explained above, the unit address register MDS stores the unit address of the latest transfer of internal token and the register flag F/MD is set at the completion of the internal token transfer. Consequently, at the next transfer of the internal token, the steps S9-2, S9-3 and S9-4 are skipped due to the presence of the register flag F/MD, and the content of the unit address MDS is set as the device selecting signal DS (step S9-21). Thus said next transfer is started from a unit of which unit address is stored in said unit address register MDS.

In the course of internal token transfer with the successive increase of the device selecting signal DS, said signal DS eventually reaches the maximum value [111]. Upon detection of such state (step S9-4), the sub-master sets the final unit flag F/FU (step S9-5) and transmits the final unit address [111] as the device selecting signal DS (step S9-6) for identifying the presence of any unit newly joining the communication.

Figure 11:
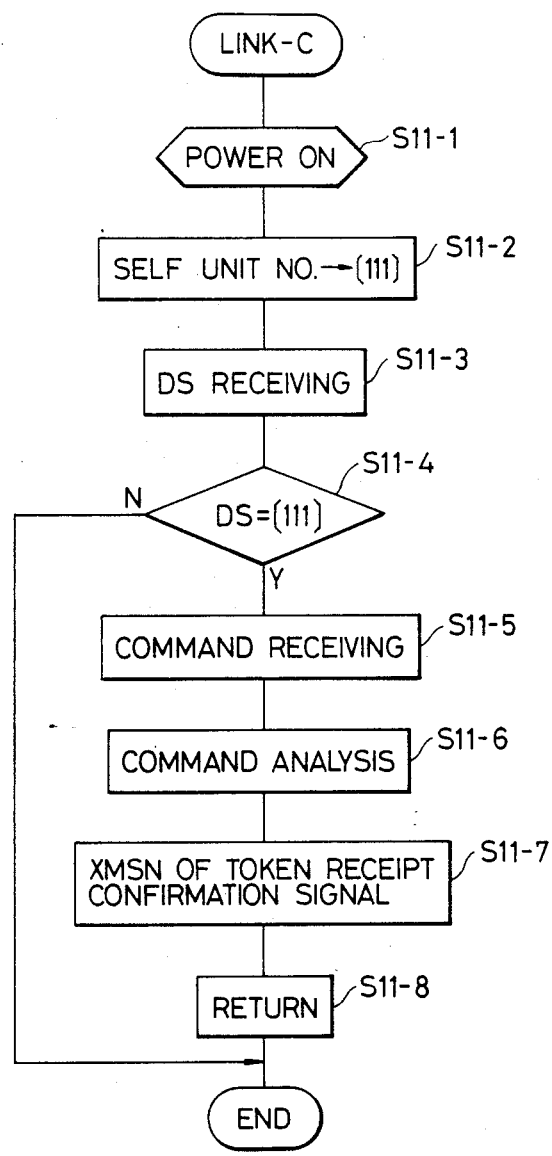

FIG. 11 shows the operation in case a unit joins the communication later. In response to the start of power supply (step S11-1), the unit changes the unit address thereof to the aforementioned final unit address [111] (step S11-2), and, upon reception of the device selecting signal DS from the sub-master (step S11-3), identifies whether said signal DS is equal to [111] (step S11-4). If said signal is not equal to [111], said unit executes no action. On the other hand, if said signal is [111], the unit receives and decodes the succeeding command (steps S11-5, S11-6), then releases the token reception confirmation signal (step S11-7) and returns the unit address from [111] to the original unit address SDS.

The unit joining the communication later response to the device selecting signal DS [111] in the above-explained manner.

The sub-master identifies the presence of a newly joining unit by the token reception confirmation signal responding to the device selecting signal DS [111], and discriminates the presence of the final unit flag F/FU (step S9-12). Since said flag is set in this case, the sub-master clears said final unit flag F/FU (step S9-16), and transmits the device selecting signal DS [000] as the broadcasting address, followed by the reset command (steps S9-17, S9-18 and S9-19).

Each unit receiving the device selecting signal DS [000] receives and decodes the succeeding reset command regardless of the unit address thereof, whereby the register flags F/MD and the unit address registers MDS in all the units are cleared (steps S10-10 and S10-11). Consequently the device selecting signal DS is addressed to units which have been skipped in the preceding transfer of the internal token.

The sub-master which has transmitted the reset command then sets [001] as the device selecting signal DS and re-starts the internal token transfer operation.

On the other hand, in the absence of response to the device selecting signal DS [111] from other units, the sub-master sets the device selecting signal DS to [001] and re-starts the internal token transfer operation, without the unit resetting operation in this case.

In the foregoing embodiment each unit address is represented by a number of 3 bits, but the unit address is naturally not limited to such case and the number of bits of the unit address and of the device selecting signal DS may be suitably increased or decreased according to the number of units.

Also in the foregoing embodiment the signal transmission is achieved by optical communication system utilizing optical fibers, but the present invention is naturally applicable to a case in which the transmission channels are composed for example of coaxial cables. Also each unit in the foregoing embodiment is equipped with only one reader, printer and/or memory, but there may be provided plural units of reader, printer or memory in the same sub-system.

Also in the token passing the unit address may be successively decreased instead of being increased. Furthermore the method of token passing within a sub-system is naturally applicable also to the token passing within the system, namely among different sub-systems.

As explained in the foregoing, the present invention not only allows access to the memory from any sub-system within the network, but also enables direct data communication, without the use of main communication channels, among the units of a particular sub-system to which said memory belongs. Consequently, even in case of transmitting the image signals stored in said memory to a printer several hundred times, the communication through the main transmission channels is still permitted if said printer belongs to said particular subsystem, whereby the transmission efficiency is improved in relative sense. A further improvement in the transmission efficiency can be achieved if a memory is provided in each of the most frequently used locations or offices.

Also the communication in the system is controlled not only by the "external token" moving in the main transmission loop but also by the "internal token" moving among the terminal units of the sub-system, and all the units in the sub-system can equally participate in the network, so that a unit of a sub-system not including a memory can utilize the memory of another sub-system to easily achieve highly advanced processes such as image editing.

What is claimed is:

1. A data communication system comprising a plurality of terminal units each provided with an assigned address, wherein:
   a terminal unit, which has been given a communication right, is able to perform data communication with other terminal units and said communication right is transferred when a transfer command having an address defined according to a predetermined procedure is transferred from the terminal unit having the communication right to another terminal unit having said defined address; and
   a terminal unit, which joins the communication later and has a particular address different from the address assigned as a self address, is adapted to respond to a specific command having said particular address sent from the terminal unit having the communication right, and said terminal unit having the communication right identifies the later joining terminal unit upon detection of a response to the specific command.

2. A data communication system according to claim 1, wherein said later joining terminal unit changes the particular address to the assigned address after being identified.

3. A data communication system according to claim 1, wherein the terminal unit which has identified the later joining terminal unit informs the other terminal units of such fact.

4. A data communication system according to claim 1, wherein said terminal unit is adapted to remember the address of a terminal unit to which the communicating right is to be transferred, and clears the thus-remembered address in response to the detection of a terminal unit later joining in the system.

5. A data communication system comprising a plurality of terminal units each provided with an assigned address, wherein:
   a terminal unit, which has been given a communication right, is able to perform data communication with other terminal units;
   the terminal unit given the communication right functions as a master unit and is operative to search for and identify other terminal units with which the master unit is capable of data communication, to transfer the communication right to said identified terminal unit after completion of the data communication, and to store the address of said identified terminal unit so as to transfer the communication right to said identified terminal unit after one circulation of the communication right among said plurality of terminal units without said searching and identifying operation; and
   in the presence of a terminal unit joining in the system later, each terminal unit clears the stored address.

6. A data communication system according to claim 5, wherein the presence or absence of a terminal unit joining the system later is identified by the response to a transfer command having a particular address.

7. A data communication system according to claim 5, wherein the terminal unit having the communication right transfers the communicating right to a terminal unit of an address calculated from the address of first-mentioned terminal unit.

8. A data communication system according to claim 5, wherein each terminal unit is able to identify, if having the communication right, the presence of the later joining terminal unit, and the terminal unit which has identified the later joining terminal unit informs the other terminal units of such fact.

9. A data communication system according to claim 5, wherein, in the presence of the later-joining terminal unit, the terminal unit having the communication right is operative to transfer the communication right to a specified terminal unit provided with a predetermined one of the assigned addresses.

* * * * *

UNITED STATES PATENT AND TRADEMARK OFFICE
CERTIFICATE OF CORRECTION

PATENT NO. : 4,575,846  Page 1 of 2
DATED : March 11, 1986
INVENTOR(S) : Yoshikazu Yokomizo It is certified that error appears in the above-identified patent and that said Letters Patent is hereby corrected as shown below:

Column 3, line 17, change "(0/E)" to --(O/E)--;

line 19, change "(E/0)" to --(E/O)--; and line 39, change "the" to --or--.

Column 4, line 8, change "broken-lined" to --broken-line--;

line 19, change "P-I/0" to --P-I/O--; and line 41, change "respectively" to --respective--.

Column 5, line 14, change "$\overline{USE}$are" to --$\overline{USE}$ are--; and

UNITED STATES PATENT AND TRADEMARK OFFICE
CERTIFICATE OF CORRECTION

PATENT NO. : 4,575,846  Page 2 of 2
DATED : March 11, 1986
INVENTOR(S) : Yoshikazu Yokomizo It is certified that error appears in the above-identified patent and that said Letters Patent is hereby corrected as shown below:

line 16, change "$\overline{\text{BUS}}$ $\overline{\text{SIG}}$" to --$\overline{\text{BUS}}$, $\overline{\text{SIG}}$--.

Column 6, line 46, change "the [111]" to --the unit address [111]--.

Column 7, line 22, change "the" second occurrence to --and--.

Column 8, line 12, change "response" to --responds--.

Column 9, line 46, change "said" to --each--.

Column 10, line 1, change "communicating" to --communication--; and line 31, change "communicating" to --communication--.

Signed and Sealed this

Thirteenth Day of January, 1987

*Attest:*

DONALD J. QUIGG

*Attesting Officer*    *Commissioner of Patents and Trademarks*